United States Patent [19]

St. Louis

[11] Patent Number: 4,825,140
[45] Date of Patent: Apr. 25, 1989

[54] POWER TOOL/VACUMM CLEANER POWER CONTROL

[76] Inventor: Raymond F. St. Louis, 32 Rensselaer Rd., Essex Fells, N.J. 07021

[21] Appl. No.: 189,730

[22] Filed: May 3, 1988

[51] Int. Cl.$^4$ ............................................. G05F 1/455
[52] U.S. Cl. .................................... 323/237; 323/300; 323/320; 323/908
[58] Field of Search ............... 323/234, 237, 238, 241, 323/299, 300, 318, 320, 321, 322, 325, 901, 908; 51/273

[56] References Cited

U.S. PATENT DOCUMENTS

| | | | |
|---|---|---|---|
| 3,947,751 | 3/1976 | Bray | 323/908 X |
| 4,555,741 | 11/1985 | Masaki | 323/908 X |
| 4,697,389 | 10/1987 | Romine | 51/273 X |
| 4,716,511 | 12/1987 | Masaki | 323/908 X |
| 4,754,579 | 7/1988 | Batt | 51/273 X |
| 4,765,099 | 8/1988 | Tanner | 51/273 X |

Primary Examiner—Patrick R. Salce
Assistant Examiner—Emanuel Todd Voeltz
Attorney, Agent, or Firm—Donald N. Timbie

[57] ABSTRACT

A power controller having first and second power outlets, connections between one side of an A.C. line to one side of each outlet, a current sensing impedance connected between the other side of the A.C. line and the other side of the first power outlet, a triac connected between the other side of the A.C. line and the other side of the second power outlet, a first operational amplifier normally maintaining the triac in a non-conductive condition and a second operational amplifier to cause current to flow through the triac to the second power outlet after a selected time delay whenever an appliance such as a power tool that is coupled to the first power outlet draws a given amount of current through the sensing impedance.

3 Claims, 1 Drawing Sheet

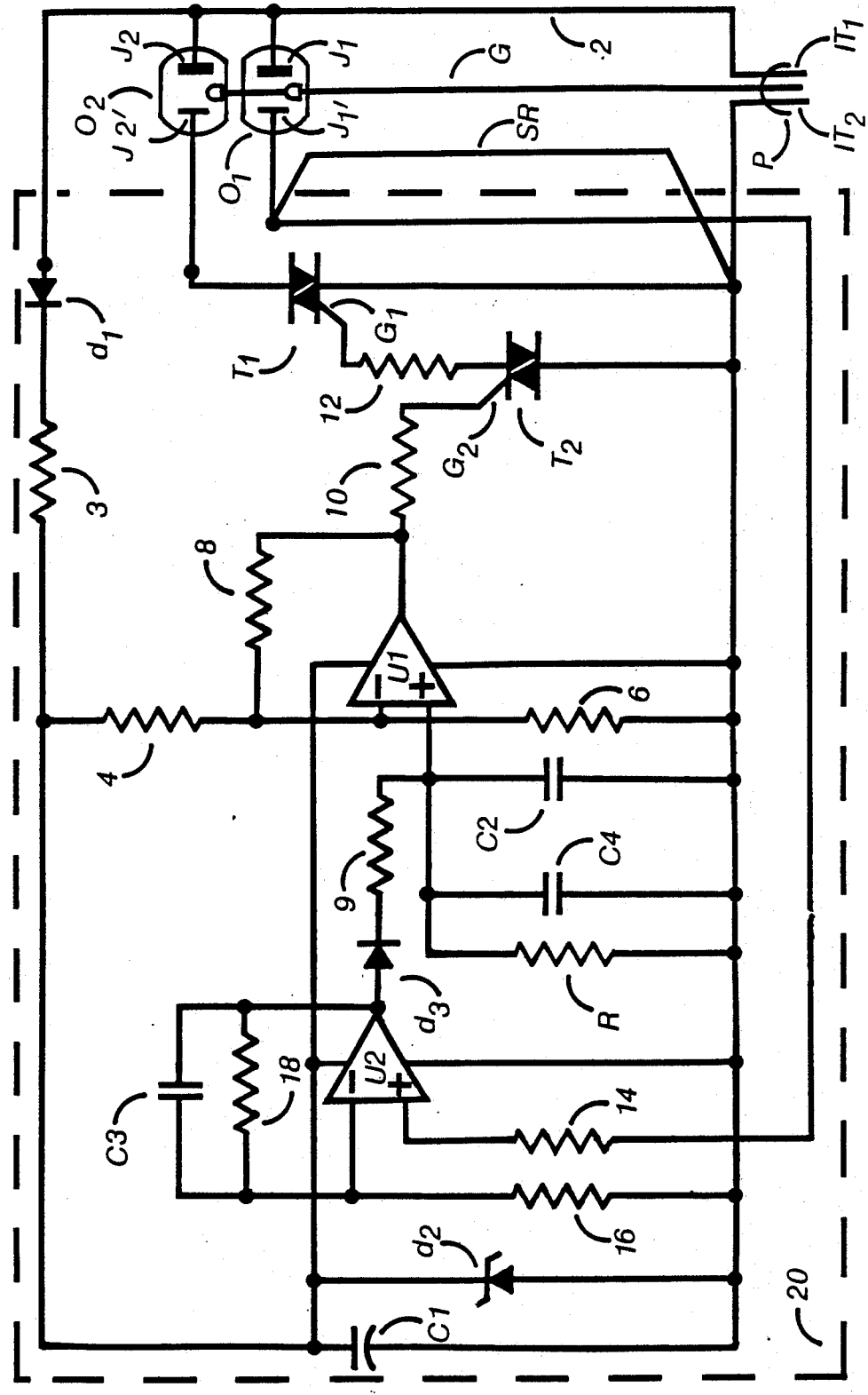

POWER TOOL/VACUMM CLEANER POWER CONTROL

BACKGROUND OF THE INVENTION

In home workshops as well as industrial workshops it is often desirable to attach a shop vacuum or dust collector to a power tool such as a power saw, planer, sander, or other device, to collect the dust and chips generated by the machining operation. Convenience would require that the AC power to the vacuum be applied each time the AC power is applied to the power tool. Under such circumstances one may neglect to turn on the power to the dust collector when using the power tool and dust and chips will be allowed to escape into the work area, thereby defeating the purpose of attaching the dust collector to the power tool in the first place. Convention would suggest that this problem could be solved by connecting the power tool and the dust collector in some manner to the same AC power switch so that when the AC power is applied to the power tool, AC power is automatically applied to the dust collector. One of the disadvantages of this manner of connection is that the AC line fuse may blow or the circuit breaker may trip due to the high inrush current being drawn by the two motors starting at the same instant. Another disadvantage is that this manner of connection may not be physically practical such as in the case where the power switch for the power tool must be located on the handle of the tool itself, such as in the case of a handheld power planer or a handheld power sander. Convenience would require that the AC power be automatically applied to the dust collector whenever AC power is applied to the power tool and then only after the power tool has had time to reach normal operating speed and is drawing normal current, so that the in-rush current of only one motor be applied to the power line at any time.

BRIEF SUMMARY OF THE INVENTION

In a power control circuit of this invention, A.C. voltage is applied to a first power outlet via a small sensing impedance such as a few inches of ordinary house circuit wire and to a second power outlet via a triac. A first operational amplifier is coupled so as to normally turn off the triac and prevent voltage from reaching the second power outlet, and a second operational amplifier is coupled between the sensing impedance and the first operational amplifier so as to cause it to turn on the triac and permit voltage to reach the second outlet whenever current flowing in the sensing impedance exceeds a given amount. The coupling between the second operational amplifier and the first is such as to prevent the triac from turning on until a predetermined minimum current flows in the sensing impedance for a selected period. Thus, if a power tool is plugged into the first power outlet and a shop vacuum is plugged into the second, the shop vacuum will be turned on after a selected period after the power tool is turned on.

All of the components of the power control circuit can be conveniently mounted within a box that is 4.50" long 1.25" deep and 2.25" wide in such a manner that the plug for insertion into a wall outlet is on one side of the box and the first and second power outlets respectively for a power tool or the like and a shop vacuum or the like are on the other side. The fact that the triac switches only when the current drawn by a shop vacuum passes through zero prevents it from producing radio frequency interference and assures that full power is delivered to the shop vacuum without regard to whether the phase of the current drawn by the shop vacuum leads or lags or is equal to the phase of the line voltage. The fact that the sensing resistance can be wire of the same gauge as standard house wiring reduces any voltage drop to an insignificant value.

BRIEF DESCRIPTION OF THE DRAWING

The drawing is a schematic representation of a preferred form of the invented circuit.

DETAILED DESCRIPTION OF THE INVENTION

In the drawing input terminals $IT_1$ and $IT_2$ are shown as being the contacts of an A.C. power plug P that can be inserted into a wall outlet. The power input terminal $IT_1$ is connected to contacts $J_1$ and $J_2$ of power outlets $O_1$ and $O_2$ respectively via a conductor 2. The other power input terminal $IT_2$ is connected to contact $J_{1'}$ of power outlet $O_1$ via about 10 inches of house wire SR that, as will be described, acts as a sensing impedance, in this case a resistance, to indicate when a power tool or the like that is plugged into the outlet $O_1$ is drawing more than a predetermined minimum amount of RMS current. The power output terminal $IT_2$ is also coupled to the other contact $J_{2'}$ of the power outlet $O_2$ via a triac $T_1$. A ground wire G is connected to appropriate contacts in the plug P and the outlets $O_1$ and $O_2$.

The triac $T_1$ is capable of passing the maximum current permitted in the circuit and is controlled by an operational amplifier $U_1$ and a triac $T_2$ so as to normally be turned off and prevent voltage from being applied to the contact $J'_2$ of the outlet $O_2$. A rectifying means comprised of a resistor 3, a diode $d_1$, a zener diode $d_2$ and a capacitor C1 that is connected in series between the power input terminals $IT_1$ and $IT_2$ provide a regulated D.C. voltage across the capacitor C1 that serves as a supply and operating voltage for the operational amplifiers $U_1$ and $U_2$. Resistors 4 and 6 are connected in series across the operating voltage, and their junction is connected to the inverting input of $U_1$ so as to apply a bias voltage thereto. A resistor 8 is connected between the output of $U_1$ and its inverting input to set the gain of $U_1$, and resistor R and 9 are connected in series between the non-inverting input of $U_1$ and the A.C. power input terminal $IT_2$. The values of the resistors 4, and 6 may be such as to produce a positive voltage such as +9 volts at the inverting input of $U_1$. When a voltage is applied across the resistor R from an operational amplifier $U_2$, it is coupled to the non-inverting input of $U_1$ via the resistor 9 after a delay determined by the time constant of the resistor 9 and a capacitor C2. C2 is connected between the non-inverting input of $U_1$ and the power input $IT_2$.

Any +DC voltage produced at the output of $U_1$ in a manner to be described is coupled via a resistor 10 to a gate $G_2$ of a triac $T_2$ having one terminal connected via a resistor 12 to a gate $G_1$ of the triac $T_1$ and the other terminal connected to the A.C. power input terminal $IT_2$. In this situation the triac $T_2$ supplies the small amount of current required to cause $T_1$ to conduct as desired. Whenever the A.C. current passing through $T_1$ passes very close to a value of zero, $T_1$ is turned off, but it starts conduction again when the AC voltage applied to its gate $G_1$ is other than zero. This results in triac $T_1$ switching during zero current crossings and delivering full power to the load regardless of whether the phase angle of the load is resistive, capacitive, or inductive. This also prevents the generation of R.F. interference.

Energization of the outlet $O_2$ occurs whenever an appliance such as a power tool that is plugged into the outlet $O_1$ draws a predetermined amount of A.C. current through the sensing resistor SR. The energization is achieved by a circuit including an operational amplifier $U_2$. Its non-inverting input is connected via a resistor 14 to the contact $J_{1'}$ of outlet $O_1$ to which sensing the resistor SR is connected, and its inverting input is connected via a resistor 16 to the A.C. power input terminal $IT_2$ so that the A.C. voltage across the sensing resistor SR is applied between the inputs of $U_2$. A resistor 18 and a capacitor C3 are connected in parallel between the output of $U_2$ and its inverting input. The values of the resistor 18 and 16 are such as to provide considerable amplification of the small voltage produced across the sensing resistor SR. The capacitor C3 provides a reduction in the gain of $U_2$ to high frequency noise voltages that may appear on the A.C. power line. The square wave output of $U_2$ is coupled via a blocking diode $d_3$ to a capacitor C4 and resistor R so as establish a constant DC voltage level. This DC voltage is applied to the non-inverting input of $U_1$ through a time delay circuit consisting of the resistor 9 and capacitor C2 previously described.

The operation of the circuit just described is as follows. Whenever a power tool plugged into the outlet $O_1$ draws at least a predetermined minimum amount of A.C. current through the sensing resistor SR, the operational amplifier $U_2$ produces as its output a positive square wave of voltage relative to the input terminal $IT_2$ during positive half cycles of the A.C. voltage across SR. The discharging time constant of capacitor C4 and resistor R is such that this square wave voltage is converted into a DC voltage approximately equal to the peak voltage of the square wave. After a short delay caused by the charging time constant of resistor 9 and capacitor C2, the voltage at the non-inverting input of $U_1$ exceeds the bias voltage at its inverting input. The output of $U_1$ then becomes positive. The application of this positive voltage to the gate $G_2$ causes $T_2$ to turn on, and this in turn permits $T_1$ to turn on and apply voltage to a shop vacuum plugged into outlet $O_2$.

As long as the power tool draws at least the predetermined minimum current, the voltage applied to the gate $G_2$ turns on $T_2$ and $T_1$ so that the power outlet $O_2$ remains energized. When the power tool is turned off, no current flows through sensing impedance SR and the voltage across C2 is reduced by discharge through the resistor 9 and resistor R to a value less than the bias voltage applied to the inverting input of $U_1$. At this point $T_1$ is turned off and no voltage is applied to $J_{2'}$ of $O_2$.

The components within the rectangle 20 can be mounted on a printed wiring board. All components are specified in the table below.

What is claimed is:

1. A power control circuit comprising:
   first and second A.C. power input terminals,
   a first power outlet having two contacts,
   a second power outlet having two contacts,
   a connection from said first input terminal to one contact in each power outlet,
   a sensing impedance connected between said second input terminal and the other contact of said first power outlet,
   a triac having a gate and two terminals,
   a connection between one of said terminals of said triac and the other contact of said second power outlet,
   a connection between the other of said terminals of said triac and said second input terminal,
   control means for applying a voltage to said gate so as to prevent current from flowing between the terminals of said triac until a given time after a predetermined minimum value of current starts flowing in said sensing impedance and continues flowing for a given period.

2. A power control circuit as set forth in claim 2 wherein said control means is comprised of
   a first operational amplifier having inverting and noninverting inputs and an output,
   means coupling the output of said first operational amplifier to said gate of said triac,
   means including a rectifier coupled to said A.C. power input terminals for applying a D.C. bias voltage to said inverting input of said first operational amplifier,
   a second operational amplifier having inverting and noninverting inputs and an output,
   a connection between said latter non-inverting input and the end of said sensing resistance remote from said second A.C. power input terminal,
   a first capacitor,
   a blocking diode connected between the output of said second operational amplifier and one side of said capacitor,
   a connection between said one side of said capacitor and one side of a first resistor,
   a connection between said one side of said capacitor and one side of a second resistor,
   a connection between the other side of said capacitor and said second A.C. power input terminal,
   a connection between the other side of said first resistor and said second A.C. power input terminal,
   a connection between the other side of said second resistor and the non-inverting input of said first operational amplifier,
   a second capacitor,
   a connection between one side of said second capacitor and the non-inverting side of first operational amplifier,
   a connection between the other side of said second capacitor and said second A.C. power input terminals, and
   the gain provided by said second operational amplifier and the time constant of said second resistor

| | | | |
|---|---|---|---|
| R3 = 6.8K OHM | R4 = 100K OHM | R9 = 6.8 MEGOHM | R6 = 51K OHM |
| R8 = 4.7 MEGOHM | R10 = 1.8K OHM | R12 = 51 OHM | R14 = 1K OHM |
| R16 = 22K OHM | R18 = 22 MEGOHM | R = 220K OHM | SR = 0.002 OHM |
| C1 = 220 uF | C2 = 0.1 mF | C3 = 27 pF | C4 = 0.1 uF | T2 = L201E3 |
| $d_1$ = 1N4005 | $d_2$ = 1N5242B | $d_3$ = 1N4148 | $T_1$ = Q2015R5 | $U_1/U_2$ = LM358N | and second capacitor being such as to maintain a voltage at the non-inverting input of said first operational amplifier that is greater than said bias voltage so as to permit current to flow between the terminals of said triac only when current greater than a predetermined minimum is flowing through said sensing impedance.

3. A power control circuit as set forth in claim 2 wherein
said means for coupling the output of the first operational amplifier to said gate includes a second triac.

* * * * *